May 9, 1967 R. W. DAMON 3,319,192

FERROMAGNETIC DISPERSIVE DELAY DEVICE HAVING MAGNETIC FIELD BIASING MEANS TO SATISFY THE EXPRESSION $\frac{w}{v} < \sqrt{\beta_1 H_1}$ Filed March 24, 1964

INVENTOR
RICHARD W. DAMON

BY Robert J. Haase

ATTORNEY

United States Patent Office 3,319,192

Patented May 9, 1967

3,319,192

FERROMAGNETIC DISPERSIVE DELAY DEVICE HAVING MAGNETIC FIELD BIASING MEANS TO SATISFY THE EXPRESSION $\omega/\gamma<\sqrt{B_iH_i}$ Richard W. Damon, West Concord, Mass., assignor to Sperry Rand Corporation, Great Neck, N.Y., a corporation of Delaware Filed Mar. 24, 1964, Ser. No. 354,346

8 Claims. (Cl. 333—31)

Figure 1:
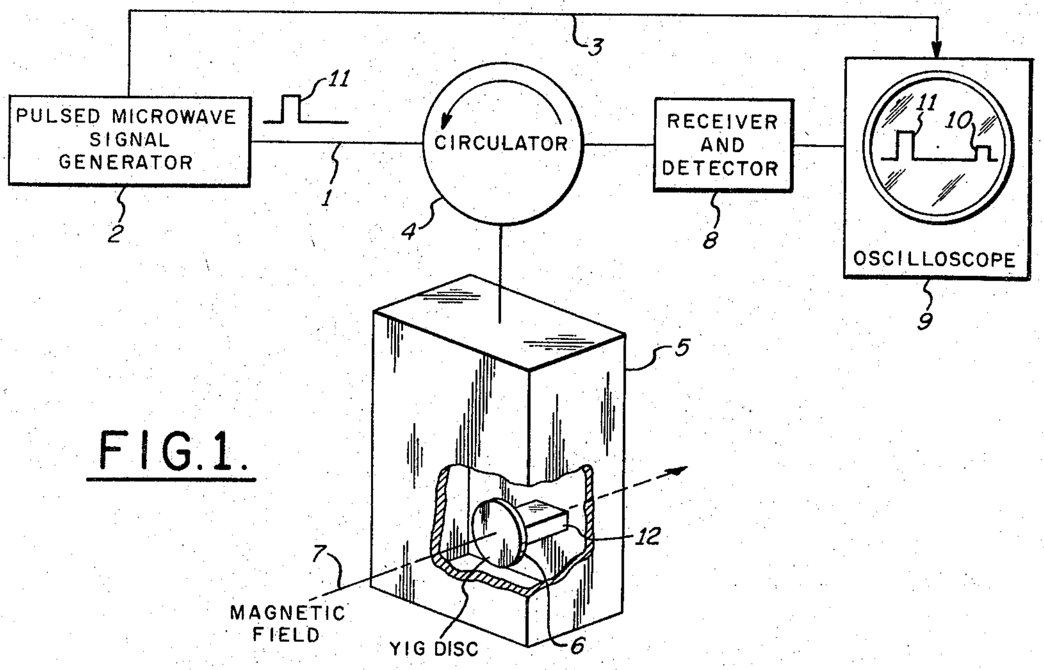

The present invention generally relates to microwave frequency dispersive delay devices and, more particularly, to a controlled ferromagnetic delay device in which energy transport is accomplished by spinwaves whose wavelength is comparable to the dimension of the device perpendicular to the direction of propagation.

There are many occasions when it is desired to provide signal-storage or signal-time delays at microwave frequencies for periods of several microseconds. A signal-delay device in which the time delay is readily controllable or in which the time delay varies in a simple manner with frequency would fulfill important needs. The most commonly used microwave frequency delay lines are coaxial cables. However, the relatively small time delay per unit of length of coaxial line necessitates large and heavy assemblages where delays of several microseconds are wanted. Another prior-art technique employs the use of fused-quartz and mercury-acoustic delay lines but these are suitable for use only at lower frequencies. The acoustic delay line becomes inoperative at microwave frequencies because of high attenuation and input and output transducer limitations. More recently, acoustic waves at microwave frequencies have been transmitted in crystal quartz and other materials. A shortcoming is that the delay time is determined by the physical length of the medium employed and is not readily variable.

A delayed pulse also has been observed in a ferromagnetic material in which the propagating mode is a combined elastic and magnetic excitation. Significantly, the time delay produced in the last mentioned case can be varied from about 1 to about 10 microseconds by varying an applied magnetic field. The technique is discussed in the paper, "Spinwave Propagation and the Magnetoelastic Interaction in Yttrium Iron Garnet," by J. R. Eshbach in the Journal of Applied Physics vol. 34, number 4 (part 2), April 1963. According to the aforementioned paper, a magnetic field variation of several hundred oersteds is required to achieve a 10 microsecond change in delay time experienced by a fixed frequency microwave signal propagating in the ferromagnetic material. Conversely, at a fixed magnetic field value, differing delay times are experienced by signals of differing microwave frequencies, but less than one microsecond change in time delay results from a 100 megacycle per second frequency increment. Thus, although the prior technique provides for controllable time delay as a function of magnetic field change or frequency change of applied signal, an undesirably large change in magnetic field or in frequency is required to achieve useful delay increments.

It is the principal object of the present invention to provide a controllable microwave signal delay device characterized by enhanced time delay and frequency dispersion.

Another object is to provide a microwave delay device in which time delay may be varied over about a 10 microsecond interval by a fraction of a percent change in the strength of an applied magnetic field.

A further object is to provide a frequency dispersive delay device in which approximately a one megacycle per second frequency increment produces approximately a one microsecond delay time change.

An additional object is to provide a microwave frequency dispersive delay device wherein the magnitude and sense of the dispersion is controllable as a function of the strength and orientation, respectively, of an applied magnetic field.

These and other objects of the present invention, as will appear from a reading of the following specification, are achieved in the disclosed embodiment by the provision of a thin disk of ferromagnetic material placed in a rectangular microwave cavity. A steady magnetic field is applied approximately along the axis of the disk at an angle within a range of about ±30° relative to said axis. Pulses of microwave energy are applied to excite the cavity periodically.

The pulses excite spinwaves in the disk which propagate in the plane of the disk. The thickness of the disk is comparable to the wavelength of the spinwaves. The group velocity and, hence, the delay time for propagation within the disk has been found to be a strongly varying function of the magnitude of the magnetic field when the magnetic field and the frequency of the applied microwave pulses are related in accordance with the expression $$\frac{\omega}{\gamma}<\sqrt{B_iH_i}$$

where $\omega$ represents the radian microwave frequency of the applied pulse, $\gamma$ is the gyromagnetic ratio of the ferromagnetic material, $B_i$ is the internal flux density (within the ferromagnetic material), and $H_i$ is the internal magnetic field strength.

When the value of the ratio $\omega/\gamma$ exceeds $\sqrt{B_iH_i}$, variations in the strength of the applied magnetic field produce variations in the delay time experienced by the microwave energy in accordance with the aforementioned Journal of Applied Physics paper. It has been observed, that when the magnetic field is increased in magnitude so that the value of the ratio $\omega/\gamma$ just falls below $\sqrt{B_iH_i}$, the sensitivity of delay time to magnetic field value or to input frequency value suddenly increases by two orders of magnitude. Furthermore, whereas delay time increases relatively slowly with increasing magnetic field in accordance with the prior art interaction, the delay time decreases relatively rapidly with increasing magnetic field in accordance with the interaction of the present invention.

Figure 2:
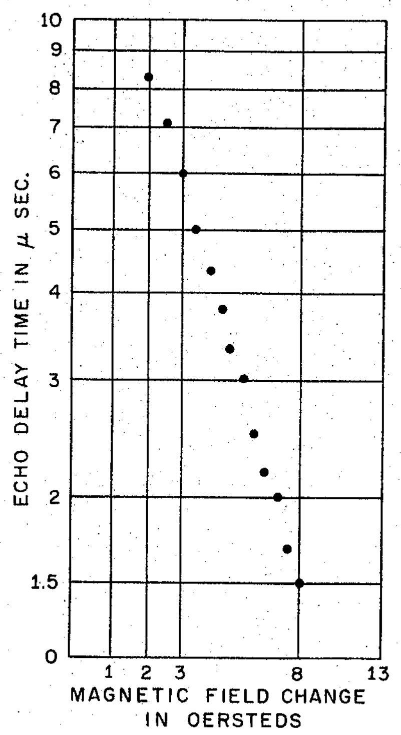

For a more complete understanding of the present invention, reference should be had to the following specification and to the appended figures of which:

FIG. 1 is a simplified schematic diagram of a typical embodiment of the present invention equipped for the display of the delayed pulses resulting from changes in the magnitude of the applied magnetic field; and FIG. 2 is a typical plot of pulse delay times resulting from changes in the magnitude of the applied magnetic field in the embodiment of FIG. 1.

Referring to FIG. 1, a series of recurring pulses of microwave energy are provided on line 1 by generator 2. A series of oscilloscope timing triggers, synchronous with the pulses on line 1, also are provided by generator 2 on line 3. The microwave pulses are coupled via circulator 4 to a rectangular microwave resonant cavity 5. A disk-shaped ferromagnetic member 6 is supported within cavity 5 by dielectric post 12. The magnetic field represented by vector 7 is directed approximately along the axis of disk 6. Pulses produced within cavity 5 are coupled via circulator 4 to microwave pulse receiver and detector 8. The detected pulses are displayed on oscilloscope 9 whose sweep is synchronized to the occurrences of the microwave pulses on line 1 by the pulses of line 3.

In one typical instrumentation of the present invention, the ferromagnetic material 6 is a disk of yttrium-iron garnet having a diameter of 0.150 inch and a thickness of 0.010 inch. The disk is placed in rectangular microwave cavity 5 operating in the $TE_{103}$ mode. The precise location of the ferromagnetic sample within the resonant cavity is unimportant. Pulses of microwave energy at 9330 megacycles per second are provided by generator 2 and applied to the cavity. Pulsed microwave energy emerging from the cavity is amplified and detected within receiver and detector 8 and displayed as a function of time on oscilloscope 9. The rectangular resonant cavity 5 of the disclosed embodiment enhances the efficiency of coupling the microwave energy to disk 6 but may be dispensed with if other design considerations dictate the use of a broadband structure. Alternatively, other conventional tuned couplers could be employed such as various coaxial or stripline coupling devices or cavities with shapes other than rectangular.

Upon the application of a magnetic field 7 of about 4000 oersteds directed substantially along the axis of disk 6, an echo 10 of the input pulse 11 is observed on oscilloscope 9. The delay time, i.e., the time separation between pulses 10 and 11, increases slowly from approximately one microsecond to approximately 10 microseconds in response to an increase in the magnitude of the applied magnetic field from about 400 oersteds to about 4,800 oersteds. The delayed echoes are attributed to magnetoelastic wave propagation in disk 6 as described in the aforementioned Journal of Applied Physics paper.

With a slight further increase in the magnitude of the applied magnetic field to a value of 4880 oersteds, the delay time between pulses 10 and 11 begins to decrease rapidly. The delay time decreases by about 10 microseconds in response to an increase of less than 10 oersteds from a value of 4880 to 4888 oersteds. The relatively rapid decrease in delay time as a function of increasing magnetic fiield is plotted in FIG. 2 and is the region of operation of interest in the present invention. The effects are observable with the magnetic field positioned at varying angles up to $\pm 30°$ relative to the axis of disk 6. With a further increase in the magnitude of the magnetic field, abrupt and violent variations occur in the cavity output which are attributed to magnetostatic mode resonances of the ferromagnetic member 6.

Not only is the delay time sensitivity to variation in magnetic field greatly enhanced over prior techniques, but similar improvement also is achieved in the delay time versus input frequency characteristic. The latter property is of particular interest in pulse compression applications wherein the magnetically biased ferromagnetic member of the present invention is utilized to introduce delays in the components of a frequency-swept signal in accordance with the frequency values of the components. Whereas previous ferromagnetic members provided time delays of about 1 microsecond for each 100 megacycle per second shift in frequency, an equal time delay increment is achieved by the present invention for each one megacycle per second frequency shift. Thus, the present invention achieves two orders of magnitude improvement in the delay-time characteristic as a function of magnetic field (for fixed input frequency) or as a function of input frequency (for fixed magnetic field). The sign of the frequency dispersion has been found to be a function of the angle at which the magnetic field is applied to the ferromagnetic member and a function of the shape of the member.

The delayed or echo pulses decrease in amplitude with increasing delay. Delay increments of 10 microseconds have been observed when the ferromagnetic member 6 is maintained at a tempature of 4° K. or below. However, pulses delayed up to several microseconds relative to input pulse 11 have been observed at room temperature (300° K.). It has been determined that the delay time for pulse propagation in the ferromagnetic member 6 is a strongly varying function of the applied-magnetic field and the frequency of the input energy when the wavelength of the spinwaves is comparable to the thickness of member 6. This condition can be met using a ferromganetic disc in an axial-magnetic field by adjusting the magnitude of the magnetic field in accordance with the relationship $$\frac{\omega}{\gamma} < \sqrt{B_i H_i}$$

wherein $\omega$ is the radian microwave frequency, $\gamma$ is the gyromagnetic ratio ($1.76 \times 10^7$ oe.$^{-1}$ sec.$^{-1}$ for yttrium-iron garnet material), $B_i$ represents the internal flux density (within the ferromagnetic material), and $H_i$ represents the internal magnetic field strength.

It will be noted that an extremely small percentage change is required in the value of the applied-magnetic field in order to produce the full range of pulse delays contemplated by the present invention. In the described embodiment, for example, a field change of less than 10 oersteds beyond the value of 4880 oersteds causes a 10 microsecond decrease in delay time. Although such precise regulation of a magnetic field can be achieved through the use of a carefully controlled electromagnet, it is preferred that the field be produced by a combination of a permanent magnet and an electromagnet. The design tolerances of the electromagnet current source can be relaxed considerably by requiring that it produce only the incremental field of less than ten oersteds. The fixed remainder of the applied-magnetic field then is provided by the permanent magnet. An additional advantage is that the resulting minimum amount of control current facilitates the rapid change of current magnitude where fast delay control action is desired.

Other (non-disk) shapes are suitable for the ferromagnetic material provided that the system is adjusted so that the wavelength of the spinwaves propagating in the material is comparable to the dimension of the material perpendicular to the direction of propagation. For example, a disk may be used with a magnetic field directed along the plane of the disk for spin waves propagating along the field. A cylinder of ferromagnetic material also is appropriate with the magnetic field either along or perpendicular to the cylinder axis. Inasmuch as the cylinder and the disk are merely two limiting cases of ellipsoidal shapes, any intermediate ellipticity is suitable.

While the invention has been described in its preferred embodiments, it is understood that the words which have been used are words of description rather than of limitation and that changes within the purview of the appended claims may be made without departing from the true spirit and scope of the invention in its broader aspects.

What is claimed is:

1. A dispersive delay device for microwave energy comprising a member of ferromagnetic material, means for coupling microwave energy to and from said member, and magnetic field means for biasing said member to satisfy the expression $$\frac{\omega}{\gamma} < \sqrt{B_i H_i}$$

wherein $\omega$ is the radian frequency of said microwave energy, $\gamma$ is the gyromagnetic ratio of said member, $B_i$ represents the internal magnetic flux density, and $H_i$ represents the internal magnetic field strength, said microwave energy propagating as spinwaves whose wavelength is comparable to the dimension of said material perpendicular to the direction of propagation of said spinwaves, said microwave energy experiencing a propagating time delay which varies relatively rapidly as a function of frequency and magnetic field strength.

2. A device as defined in claim 1 wherein said member is maintained at a temperature of the order of 4 degrees Kelvin.

3. A dispersive delay device for microwave energy comprising a disk of ferromagnetic material, means for coupling microwave energy to and from said disk, means for directing a magnetic field at said disk within an agle of approximately ±30° relative to the axis of said disk so that the value of the quotient $\omega/\gamma$ just falls below the value of the radical $\sqrt{B_iH_i}$ wherein $\omega$ is the radian frequency of said microwave energy, $\gamma$ is the gyromagnetic ratio of said member, $B_i$ represents the internal magnetic flux density, and $H_i$ represents the internal magnetic field strength, said microwave energy propagating as spinwaves whose wavelenth is comparable to the dimension of said material perpendicular to the direction of propagation of said spinwaves, said microwave energy experiencing a propagating time delay which varies relatively rapidly as a function of frequency and magnetic field strength.

4. A dispersive delay device for microwave energy comprising a member of ferromagnetic material, resonant means for coupling microwave energy to and from said member, and magnetic field means for biasing said member to satisfy the expression $$\frac{\omega}{\gamma}<\sqrt{B_iH_i}$$

wherein $\omega$ is the radian frequency of said microwave energy, $\gamma$ is the gyromagnetic ratio of said member, $B_i$ represents the internal magnetic flux density, and $H_i$ represents the internal magnetic field strength, said microwave energy propagating as spinwaves whose wavelength is comparable to the dimension of said material perpendicular to the direction of propagation of said spinwaves, said microwave energy experiencing a propagating time delay which varies relatively rapidly as a function of frequency and magnetic field strength.

5. A device as defined in claim 4 wherein said resonant means comprises a rectangular resonant cavity, said member being positioned within said cavity.

6. A dispersive delay device for microwave energy comprising a disk of ferromagnetic material, rectangular resonant cavity means for coupling microwave energy to and from said disk, said disk being positioned within said cavity, and means for directing a magnetic field at said disk within an angle of approximately ±30° relative to the axis of said disk so that the value of the quotient $\omega/\gamma$ just falls below the value of the radical $\sqrt{B_iH_i}$ wherein $\omega$ is the radian frequency of said microwave energy, $\gamma$ is the gyromagnetic ratio of said member, $B_i$ represents the internal magnetic flux density, and $H_i$ represents the internal magnetic field strength, said microwave energy propagating as spinwaves whose wavelength is comparable to the dimension of said material perpendicular to the direction of propagation of said spinwaves, said microwave energy experiencing a propagating time delay which varies relatively rapidly as a function of frequency and magnetic field strength.

7. A dispersive delay device as defined in claim 6 wherein said disk is maintained at a temperature of the order of 4° Kelvin.

8. A delay device as defined in claim 6 wherein said disk is yttrium-iron garnet.

References Cited by the Examiner

UNITED STATES PATENTS 2,922,125 1/1960 Suhl -------------- 333—24.1

OTHER REFERENCES

Eshbach, J. R., Journal of Applied Physics, vol 34, No. 4 (Part 2), April 1963, QC1J82, pp. 1299, 1300, 1303 relied on.

ELI LIEBERMAN, *Primary Examiner.*

HERMAN K. SAALBACH, *Examiner.*

P. L. GENSLER, *Assistant Examiner.*